United States Patent [19]

Ho-A-Chuck

[11] Patent Number: 5,828,962
[45] Date of Patent: Oct. 27, 1998

[54] PROCESS FOR ANALYZING TRAFFIC LOCALIZATION WITHIN A CELLULAR RADIOCOMMUNICATION NETWORK

[75] Inventor: Olivier Ho-A-Chuck, Paris, France

[73] Assignee: France Telecom, France

[21] Appl. No.: 842,815

[22] Filed: Apr. 17, 1997

[30] Foreign Application Priority Data

Apr. 18, 1996 [FR] France .................................. 96 04865

[51] Int. Cl.⁶ .................................................. H04B 17/00
[52] U.S. Cl. ........................ 455/446; 455/423; 455/67.1; 455/524
[58] Field of Search .................................... 455/512, 513, 455/422, 423, 446, 448, 449, 433, 9, 514, 524, 525, 67.1

[56] References Cited

U.S. PATENT DOCUMENTS

| 5,465,390 | 11/1995 | Cohen | 455/33.4 |
|---|---|---|---|
| 5,666,656 | 9/1997 | Rautiola | 455/513 |
| 5,697,053 | 12/1997 | Hanly | 455/525 |

FOREIGN PATENT DOCUMENTS 0631453  12/1994  European Pat. Off. .
2687520  5/1994  France .

OTHER PUBLICATIONS

Tahkokorpi, Microcellular Radio Network. International Publication No.: WO 94/00959 Jan 6, 1994.

Murata et al., "Enhancing the Performance of Mobile Communications Systems", Proc. of the 2nd International Conference on Universal Personal Communications, 12–15 Oct., 1993, vol. 2, p. 732–736.

*Primary Examiner*—Reinhard J. Eisenzopf
*Assistant Examiner*—Edan Orgad
*Attorney, Agent, or Firm*—Larson & Taylor

[57] ABSTRACT

In order to analyze the localization of the traffic supported by a base station of a cellular radio communication network, the process exploits the measurements of radio parameters made by the mobile stations with regard to the base station and to neighboring base stations. Statistical processing of these measurements makes it possible, with the aid of mapping data of the measured parameter, to determine the traffic densities within the cell, at least in zones of heavy traffic density. These results allow the operator of the network to select the best places to install new base stations, especially for microcells.

4 Claims, 7 Drawing Sheets

$(-8 \leq CMC(C0-C1) < 18)$ $$(-4 \leq CMC(C0-C2) < 23)$$

(CMC(C0−C6) > 30)

PROCESS FOR ANALYZING TRAFFIC LOCALIZATION WITHIN A CELLULAR RADIOCOMMUNICATION NETWORK

BACKGROUND OF THE INVENTION

The present invention relates to a process for analysing the localization of the traffic supported by a base station of a cellular radiocommunication network.

In a cellular radiocommunication network, the localization of the traffic within a cell is an important problem. Above a certain stage of densification of the network, microcellularization becomes inevitable. In a microcellular network, low-range base stations are used to form small-sized cells (microcells or picocells) contained within cells of larger size (umbrella cells). These microcells make it possible to relieve the burden on the umbrella cells in the zones of heavy local traffic density. In practice, the installation of a microcellular network is often undertaken by adding microcells to an already existing network of relatively larger cells. The operator is then confronted with the problem of pinpointing the best sites for the microcells.

The operator therefore needs a method which makes it possible to determine the zones of heavy traffic density. Usually, the operator bases himself on marketing data in order to "guess" the zones of heavy traffic density. The operator will thus place microcells in highly frequented streets, near commercial centres, etc. Experience shows that this empirical method is often inefficient.

In the case of cells with sector antennas, it is possible to analyse the spread of traffic over the various sectors, and through a process of rotating the sectors deduce the distribution of the traffic across successive azimuths. This method has the drawback of being relatively cumbersome to implement and of providing rather inaccurate results in the case of an urban network.

Another possibility would be to use a dummy base station which would be moved around within the cell whilst counting the mobiles which attempt to register with it. This method could be efficient, but it requires considerable facilities and is different to implement.

An object of the present invention is to provide a procedure for localizing the actual traffic within a cell, so as to steer the design of a radiocommunication network with a view to desaturation or microcellularization.

SUMMARY OF THE INVENTION

The invention thus proposes a process for analysing the localization of the traffic supported by a given base station of a cellular radiocommunication network, each mobile station served by said given base station periodically transmitting to said given base station measurement samples each including values of a radio parameter measured by the said mobile station relative to said given base station and to several neighbouring base stations identified among a predetermined set of base stations neighbouring said given base station. The process includes the following steps:

gathering measurement samples received by said given base station;

processing the gathered measurement samples in such a way as to produce a processed sample of p data groups from each measurement sample emanating from a mobile station, each data group including an identifier of one of the neighbouring base stations of said predetermined set and a measurement datum dependent on the value of the radio parameter measured by the mobile station relative to the identified neighbouring base station, the data groups of each processed sample being ordered such that a group of rank i ($1 \leq i \leq p$) corresponds to the i-th largest value of the radio parameter measured relative to the neighbouring base stations of said set;

distributing the processed samples into categories, each category being associated, for each integer i lying between 1 and p, with a pair of rank i constituted by an identifier of a base station of said predetermined set and by an interval of variation, a processed sample being assigned to a category when, for each integer i lying between 1 and p, on the one hand the base station identifier of the data group of rank i of said processed sample coincides with the base station identifier of the pair of rank i associated with said category, and on the other hand the measurement datum of the data group of rank i of said processed sample falls within the interval of variation of the pair of rank i associated with said category;

associating respective geographical zones with some at least of the categories on the basis of mapping data of the radio parameter; and estimating traffic densities within said geographical zones on the basis of the numbers of samples assigned to the associated categories.

Localization thus relies on the processing of results of measurements made by the mobiles, these measurements being in any case necessary in most cellular networks, within the context of radio resources management procedures. The measurements are captured in real time, and subsequently form the subject of statistical processing making it possible to identify the zones of heavier traffic density. The method calls upon mapping data which can either be calculated by means of a prediction tool available to the operator, or determined experimentally by performing a measurement traverse.

DESCRIPTION OF A PREFERRED EMBODIMENT

Figure 1:
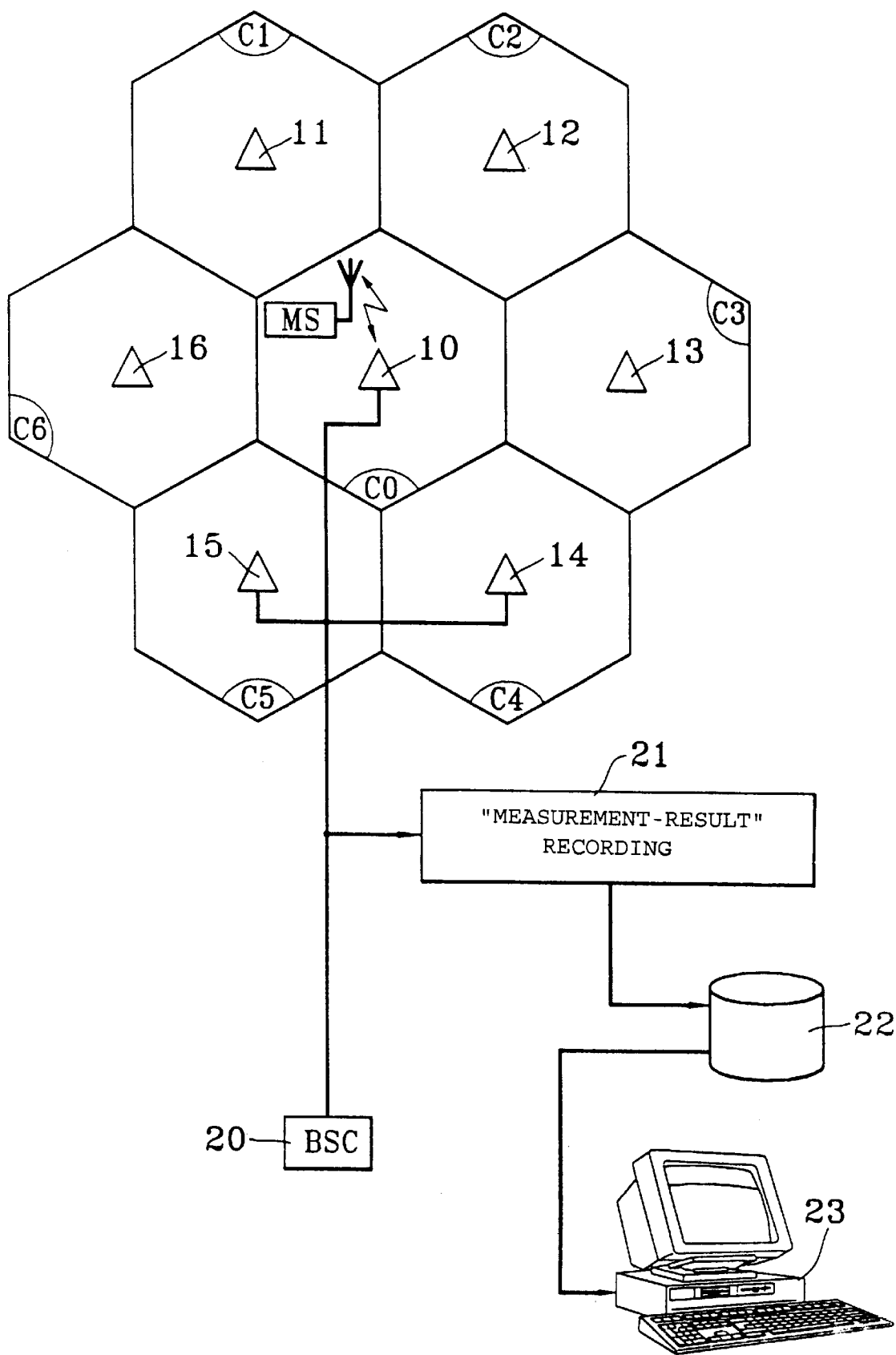
FIG. 1 is a schematic view of a cellular radiocommunication network showing in addition the means serving to implement the invention.

FIG. 1 shows seven base stations (BTS) 10–16 of a cellular radiotelephone network. The zone of coverage of each base station 10–16 is referred to as a cell C0–C6, and is represented schematically by a hexagon in FIG. 1.

In the remainder of the present description it will be assumed that the cellular network is a GSM type network. In a network of this type, each base station is linked to a functional unit termed a base station controller (BSC), each BSC being able to control one or more base stations. Thus, in the case represented in FIG. 1, the BSC 20 is associated with the base stations 10, 14, 15.

The invention exploits the measurements made by the mobile stations MS and serving, in GSM networks, in the procedures for controlling the radio links, especially for intercell handover. The measurements in question are described in detail in Recommendation GSM 05.08 (draft pr ETS 300 578, 2nd edition, March 1995, European Telecommunications Standards Institute). Each base station forwards to the mobile stations which it serves a list identifying a set of neighbouring base stations to be monitored by the mobile stations. In the case of the GSM system, the identifier of a neighbouring base station is made up of a broadcast channel (BCCH) carrier frequency number and of a six-bit identification code (BSIC). The base station forwards to the mobiles which it serves the numbers of the carrier frequencies to be monitored. By examining the BCCH channel having one of the frequencies from the list, the mobile station finds the corresponding identification code (BSIC). The mobile station measures the power level which it receives from its server base station and from the neighbouring base stations. Each value of power level is coded from decibel to decibel on six bits (parameter RXLEV), the value RXLEV=0 corresponding to a power of less than −110 dBm, and the value RXLEV=63 corresponding to a power greater than −48 dBm (see Recommendation GSM 05.08).

These measurements are returned by the mobile station to its server base station in a channel termed SACCH ("Slow Associated Control Channel"), with a periodicity of 480 ms, that is to say, every 480 ms, the mobile station despatches a measurement sample including the parameter RXLEV relating to the server base station and, for some at least of the neighbouring base stations, the parameter RXLEV and the corresponding identifier (frequency+BSIC). This measurement sample is included within a message termed MEASUREMENT_REPORT in GSM terminology. For the radio links control procedures, the base station transmits these measurement samples to the BSC in a message termed MEASUREMENT_RESULT.

The present invention proposes a statistical processing of the information contained in these MEASUREMENT_RESULT messages. A message recording unit 21 is installed on the interface between the base station under consideration and its BSC (interface A-BIS), so as to examine the messages exchanged over this interface, and select and record the MEASUREMENT_RESULT messages transmitted by said base station. In the example represented in FIG. 1, it is assumed that the base station under consideration is station 10 of cell C0 and that the set of base stations neighbouring the latter, the list of which is despatched to the mobile stations served, is made up of base stations 11 to 16 of cells C1 to C6. The recording device 21 consists for example of a protocol tester marketed under the reference K1103 by the company SIEMENS. The pertinent measurement samples are recorded on a memory medium 22 such as a diskette. The duration of the recording depends on the number N of measurement samples needed in order to analyse the localization of the traffic. In the case of cells in an urban environment, several tens of thousands of measurement samples are typically needed, it being possible for this number to vary widely depending on the compromise sought between the reliability and complexity of the statistical calculations performed.

Figure 2:
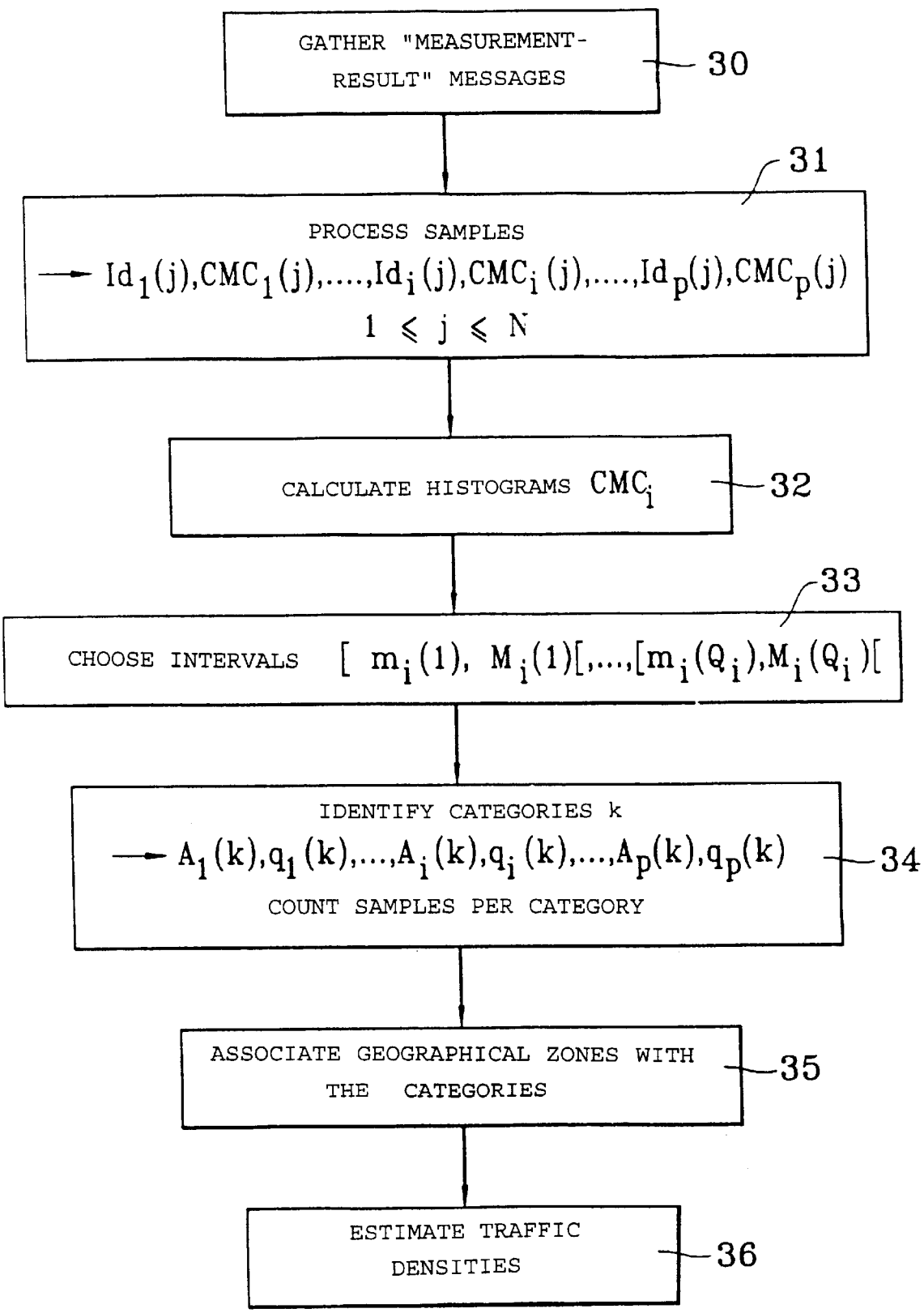
FIG. 2 is a general flowchart of a process of analysis according to the invention.

The device 21 thus performs step 30 for gathering the MEASUREMENT_RESULT messages, indicated in the flowchart of FIG. 2. The following steps 31–36 are performed by a calculator 23 such as a PC type computer.

The first step consists in a processing 31 of the measurement samples gathered. To avoid consideration of certain fadings due to "in-car" or "in-door" environments, the power levels RXLEV_NCELL(n) measured by the mobile relative to a neighbouring cell are expressed as a relative value with respect to the field level RXLEV_DL measured by the mobile from the server base station. For the neighbour n, the measurement datum CMC(n) is thus defined by CMC(n)=RXLEV_DL−RXLEV_NCELL(n), the parameters RXLEV_DL and RXLEV_NCELL(n) being those defined in Recommendation GSM 05.08. For each measurement sample, the power levels are ranked in descending order. Each processed sample j ($1 \leq j \leq N$) is thus made up of p data groups $Id_i(j)$, $CMC_i(j)$ for $1 \leq i \leq p$, where $Id_i(j)$ denotes the identity (frequency BCCH and BSIC concatenated) of the base station neighbouring the server station, from which the mobile station at which the sample originated has measured the i-th largest value of power level from among the neighbouring stations monitored, and $CMC_i(j)$ denotes the corresponding value of the measurement datum CMC.

The processed samples are then distributed into categories. Each category k is defined by p ordered pairs $A_i(k)$, $q_i(k)$ ($1 \leq i \leq p$) each consisting of the identity $A_i(k)$ of one of the neighbouring base stations C1–C6 and of an interval of variation denoted by an index $q_i(k)$. For each integer i lying between 1 and p, the index $q_i(k)$ can take $Q_i$ values $1, 2, \ldots, Q_i$, so that $Q_i$ intervals of variation are possible: $[m_i(1), M_i(1)[, \ldots, [m_i(Q_i), M_i(Q_i)[$. A processed sample j is assigned to category k if for each value i from 1 to p, $Id_i(j)=A_i(k)$ and $CMC_i(j) \in [m_i(q_i(k)), M_i(q_i(k))[$. The number of possible categories seems a priori to be very large ($[m!/(m−p)!] \times Q_1 \times \ldots \times Q_p$ if m denotes the number of neighbouring stations monitored), but in practice, the number of categories observed is much smaller, and a large part of them may also be ignored since they contain an insignificant number of samples.

The intervals of variation of the pairs of rank i defining the categories are advantageously determined on the basis of the statistical spread of the measurement data $CMC_i(j)$ for the processed samples $j=1, \ldots, N$. Thus, in step 32, the calculator determines the histograms of the measurement data $CMC_i$ for each of the ranks i, this making it possible to calculate a mean $E_i$ and a standard deviation $\sigma_i$:

$$E_i = \frac{1}{N} \sum_{j=1}^{N} CMC_i(j)$$

$$\sigma_i^2 = \frac{1}{N} \sum_{j=1}^{N} (CMC_i(j) - E_i)^2$$

These two parameters $E_i$, $\sigma_i$ are used to define the intervals of variation relating to rank i in step 33. Three possibilities may be mentioned in this respect:

(i) define $Q_i=2$ intervals with respect to the mean:$]-\infty,E_i[$, $[E_i,+\infty[$;

(ii) define $Q_i=3$ intervals with respect to the mean and the standard deviation: $]-\infty,E_i-\sigma_i[$, $[E_i-\sigma_i,E_i+\sigma_i[$, $[E_i+\sigma_i,+\infty[$;

(iii) define $Q_i=3$ intervals with respect to the mean and to the standard deviation and to a margin $\Delta_i$ which takes fading into account: $]-\infty,E_i-\sigma_i-\Delta_i[$, $[E_i-\sigma_i-\Delta_i,E_i+\sigma_i+\Delta_i[$, $[E_i+\sigma_i+\Delta_i,+\infty[$.

It is of course possible to adopt different definitions of intervals for the various ranks i. It has been noted that method (iii) provided the best results, typically with values $\Delta_i$ representing deviations in power of from 5 to 10 dB.

Once the intervals of variation have been chosen, the calculator 23 executes step 34 for identifying the categories k and for counting the samples per category. This step can be executed by means of a loop over the N samples processed. For each sample j examined during this loop, the calculator determines whether one of the categories k previously identified satisfies $Id_i(j)=A(k_i)$ and $CMC_i(j)\epsilon[m_i(q_i(k)), M_i(q_i(k))[$ for every i. If so, the number of samples $C(k)$ assigned to the category k in question is increased by one unit before examining the next sample. Otherwise, a new category k' is identified in relation with the current sample and the number C(k') thereof of samples assigned is initialized to 1 before examining the next sample. At the end of step 34, the insignificant categories (C(k) less than a floor value) can be deleted.

In step 35, the calculator associates a geographical zone with each category identified and retained in step 34. To carry out this association, the calculator bases itself on mapping data for the parameters RXLEV which can:

either be calculated with the aid of appropriate simulation software available to the operator;

or be measured experimentally by making one or more receivers, recording the power levels RXLEV sensed from stations 10–16, travel through cell C0 and its environs.

A point will belong to the geographical zone associated with a category k if a mobile station placed at this point senses, emanating from the base station under consideration and from the base stations $A_i(k)$ (i=1, ... ,p), power levels such that $CMC(A_i(k))\epsilon[m_i(q_i(k)),M_i(q_i(k))[$. The zone associated with a category k is thus an intersection of zones in which inequalities of the type $m_i(q_i(k))\leq CMC(A_i(k))<M_i(q_i(k))$ are respectively satisfied.

Figure 3:
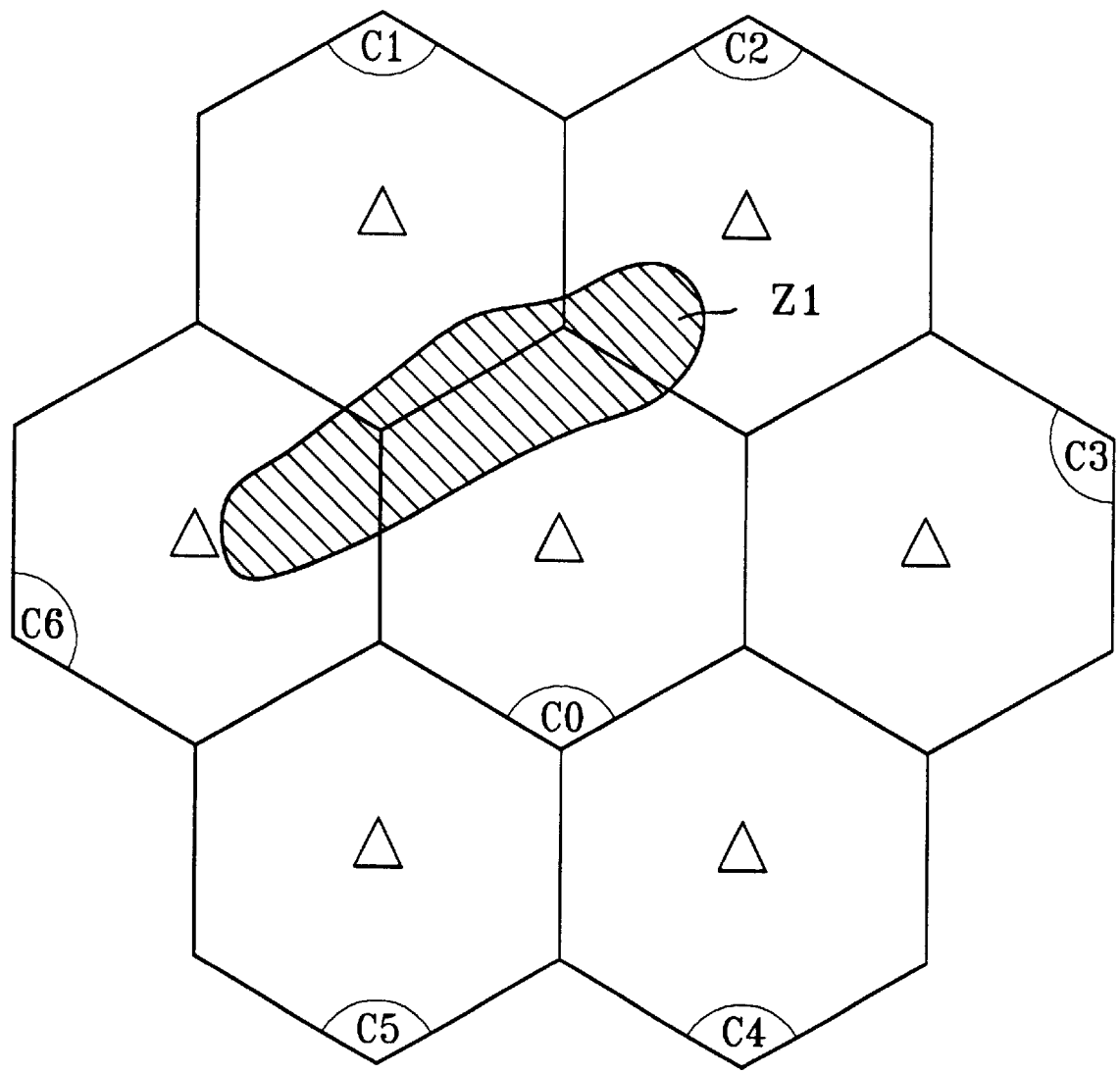
FIGS. 3 to 7 are diagrams illustrating the estimations of traffic densities within a network such as the one shown diagrammatically in FIG. 1.
Figure 4:
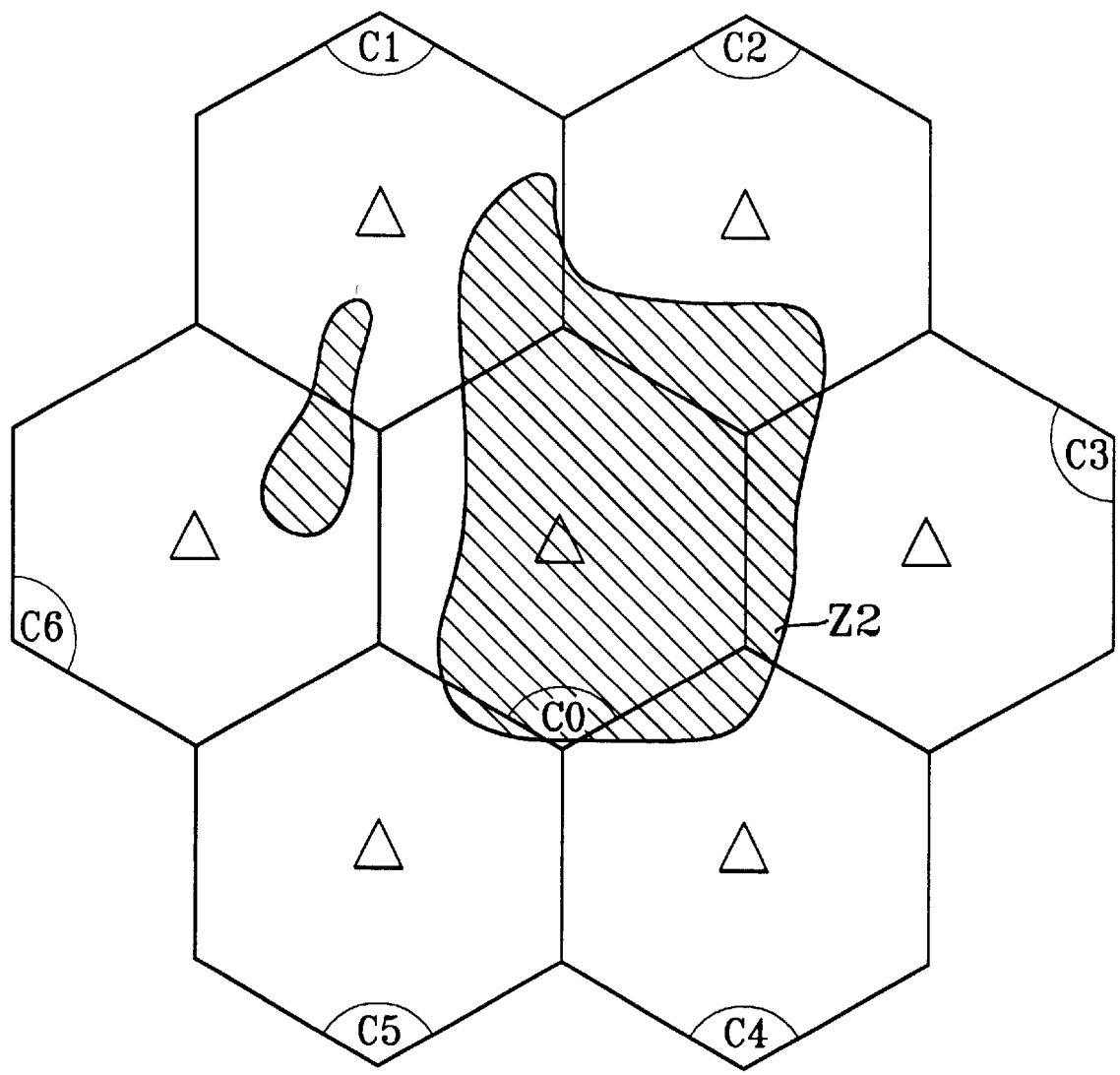
Figure 5:
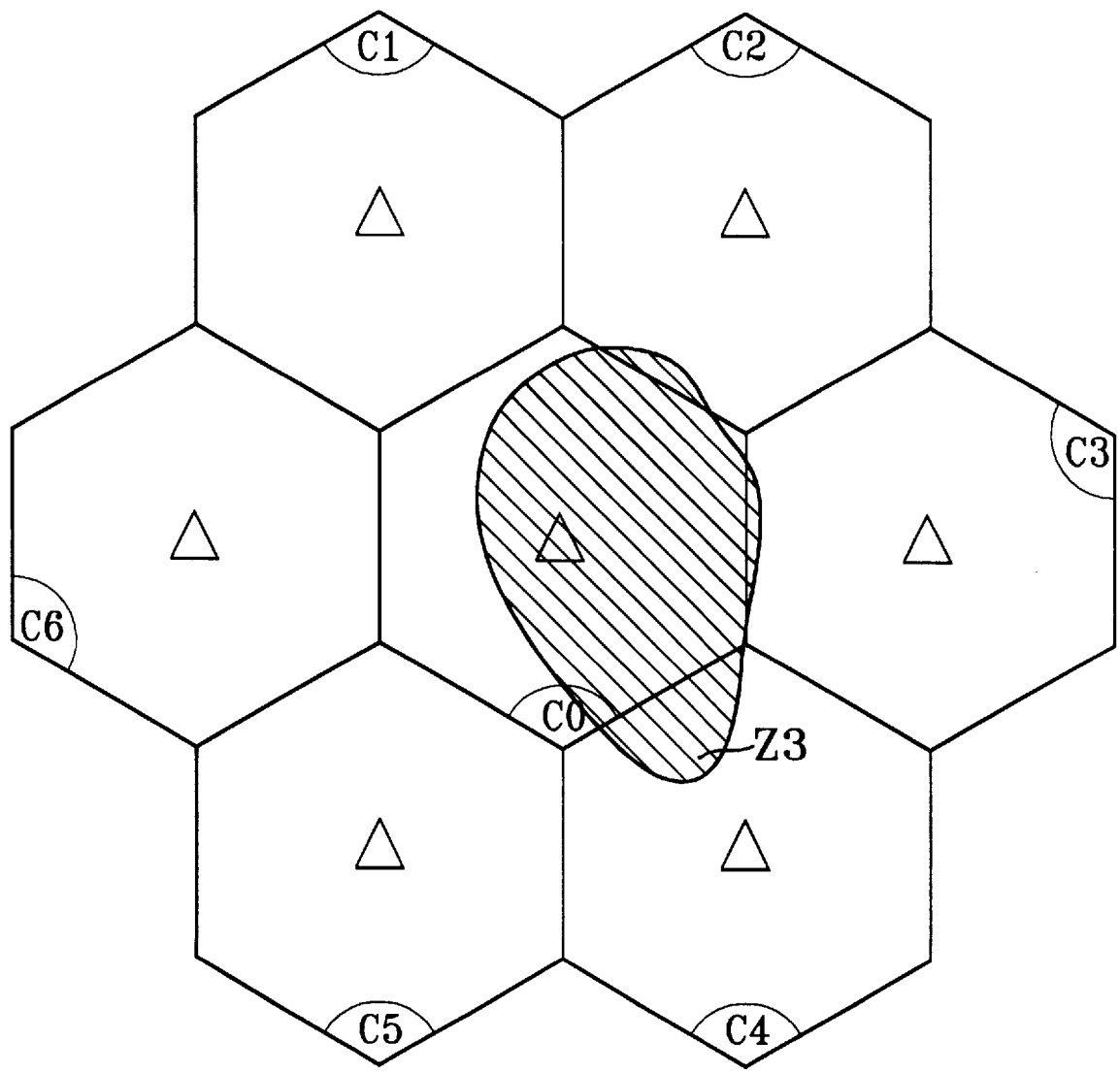
Figure 6:
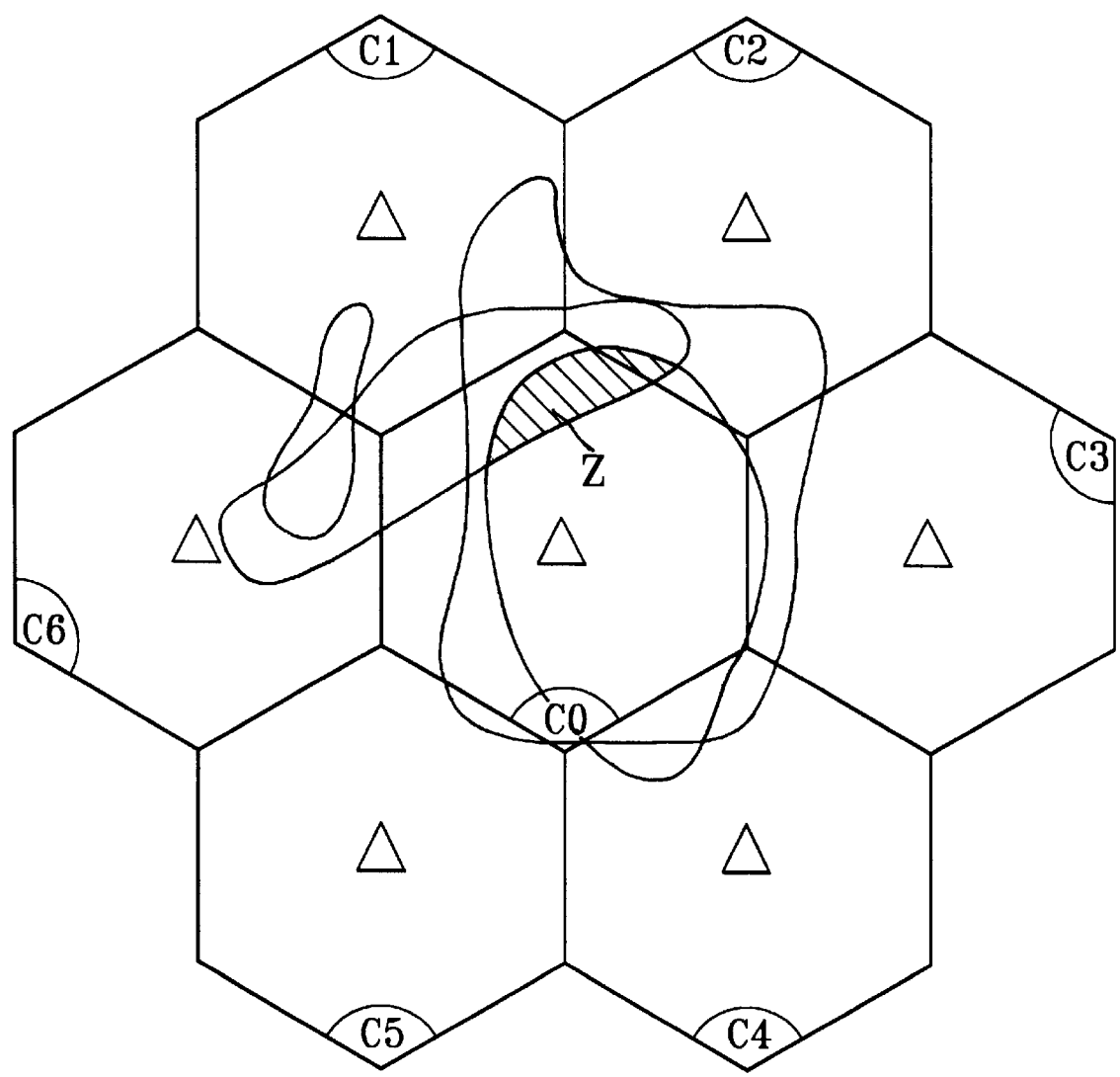

By way of illustration, considering a category k for which the pair of rank 1 includes station 11 of cell C1 and the interval [−8,18[, the pair of rank 2 includes station 12 of cell C2 and the interval [−4,23[, and the pair of rank 3 includes station 16 of cell C6 and the interval [30,+∞[(p=3), the association calculation on the basis of the mapping data can produce the zones Z1, Z2, Z3 represented hatched in FIGS. 3 to 5, respectively, the geographical zone finally associated with category k being Z=Z1∩Z2∩Z3 as illustrated by FIG. 6.

Figure 7:
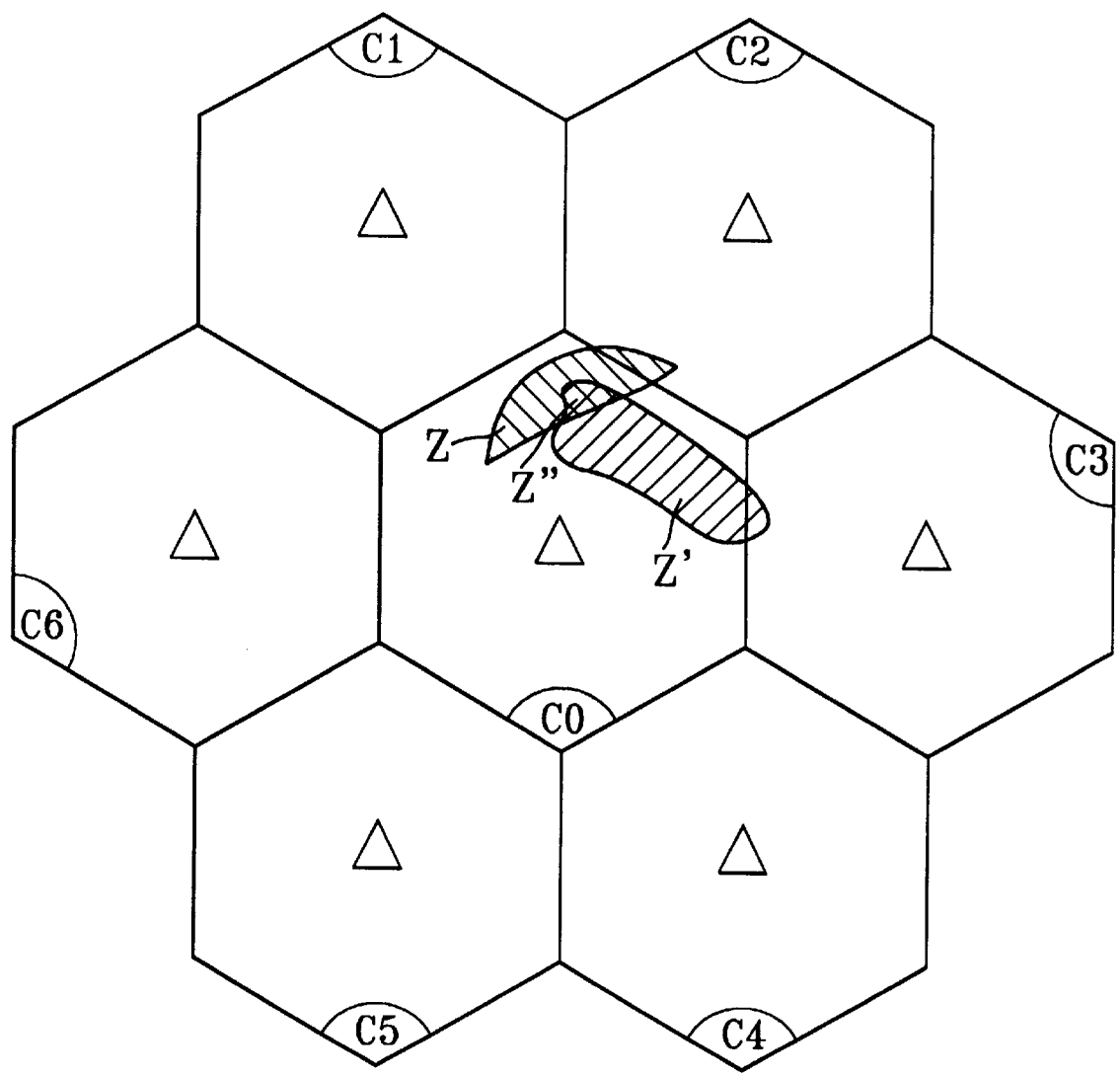

On the basis of the numbers of samples per category and the associations between the categories and the geographical zones, the calculator 23 undertakes estimation of the traffic densities within the zones in question. The elementary density of traffic within a zone associated with a category is in principle proportional to the number of samples in this category divided by the area of the zone. It is however possible for certain points to belong to several zones associated with different categories. It is then advisable to add in the elementary densities relating to the categories concerned. Referring to FIG. 7 by way of illustration, if the zone Z of area 40 is associated with a category k of C(k)=2000 samples and if the zone Z' of area 50 is associated with a category k' of C(k')=1000 samples, and if the zones Z and Z' have an intersection Z" (the units are arbitrary), then the estimated traffic density is 2000/40=50 in zone Z and 1000/50=20 in zone Z', except in zone Z" where the density is estimated at 50+20=70.

The estimated traffic densities can then be displayed, for example in the form of a map, to allow the operator to determine the best places to install new base stations.

By way of example, the applicant has been able to verify good performance of the process for analysing traffic localization, by artificially generating traffic in a small zone of a cell of area 0.23 km². The base station under consideration had m=6 neighbouring stations. The number of neighbours employed in analysing the traffic localization was p=3. $Q_1=Q_2=Q_3=3$ intervals of variation were used for each rank (method (iii) above). The a priori number of possible categories was 3240, but, out of N=81322 samples processed, only 365 categories were observed, and only 20 of them were processed (5.5% of the total number of categories observed, representing 91% of the total number of samples N, the other categories containing an insignificant number of samples). Implementation of the process according to the invention has made it possible to observe as forecast highly localized traffic, the prediction tool employed having made it possible to localize with an accuracy of the order of 15 meters the zone in which the artificial traffic was generated.

I claim:

1. Process for analysing the localization of traffic supported by a given base station of a cellular radiocommunication network, each mobile station served by said given base station periodically transmitting to said given base station measurement samples each including values of a radio parameter measured by said mobile station relative to said given base station and to several neighbouring base stations identified among a predetermined set of base stations neighbouring said given base station, the process including the steps of:

gathering measurement samples received by said given base station;

processing the gathered measurement samples in such a way as to produce a processed sample of p data groups from each measurement sample emanating from a mobile station, each data group including an identifier of one of the neighbouring base stations of said predetermined set and a measurement datum dependent on a value of the radio parameter measured by the mobile station relative to the identified neighbouring base station, the data groups of each processed sample being ordered such that a group of rank i ($1\leq i\leq p$) corresponds to the i-th largest value of the radio parameter measured relative to the neighbouring base stations of the set;

distributing the processed samples into categories, each category being associated, for each integer i lying between 1 and p, with a pair of rank i constituted by an identifier of a base station of said predetermined set and by an interval of variation, a processed sample being assigned to a category when, for each integer i lying between 1 and p, on the one hand the base station identifier of the data group of rank i of said processed sample coincides with the base station identifier of the pair of rank i associated with said category, and on the other hand the measurement datum of the data group of rank i of said processed sample falls within the interval of variation of the pair of rank i associated with said category;

associating respective geographical zones with some at least of the categories on the basis of mapping data of the radio parameter; and estimating traffic densities within said geographical zones on the basis of the numbers of samples assigned to the associated categories.

2. Process according to claim 1, wherein said radio parameter measured by a mobile station relative to a base station is a radio power level received by said mobile station from said base station.

3. Process according to claim 1, wherein the measurement datum included within a data group of a processed sample produced from a measurement sample emanating from a mobile station is a difference between a value of the radio parameter measured by said mobile station relative to the neighbouring base station identified within said data group and a value of the radio parameter measured by said mobile station relative to said given base station.

4. Process according to claim 1, wherein, for each integer i lying between 1 and p, the intervals of variation of the pairs of rank i associated with the categories are determined on the basis of a statistical spread of the measurement data of the groups of rank i of the processed samples.

* * * * *